Oct. 9, 1928.

D. RINGERS 1,687,144

HEADLIGHT ATTACHMENT

Filed Dec. 15, 1927

Inventor:
Dirk Ringers.
By Hazard and Miller
Attorneys

Patented Oct. 9, 1928.

1,687,144

UNITED STATES PATENT OFFICE.

DIRK RINGERS, OF LONG BEACH, CALIFORNIA.

HEADLIGHT ATTACHMENT.

Application filed December 15, 1927. Serial No. 240,153.

This invention relates to vehicle headlights, and more particularly to accessories for use with such headlights.

An object of the invention is the provision of an accessory having ready means of attachment to a vehicle headlight and capable of indicating to the driver of the vehicle whether or not the headlight is properly illuminated.

Another object is the provision of an accessory attachable to a headlight and capable of reflecting the light emanating from the headlight of an approaching vehicle to warn its driver that the headlight to which the accessory is attached is not properly illuminated.

The invention possesses other objects and features of advantage, some of which, with the foregoing, will be set forth in the following description of the preferred form of my invention which is illustrated in the drawings accompanying and forming part of the specification.

It is to be understood that I do not limit myself to the showing made by the said drawings and description, as I may adopt variations of the preferred form within the scope of my invention as set forth in the claims.

Referring to the drawings.

Figure 1:
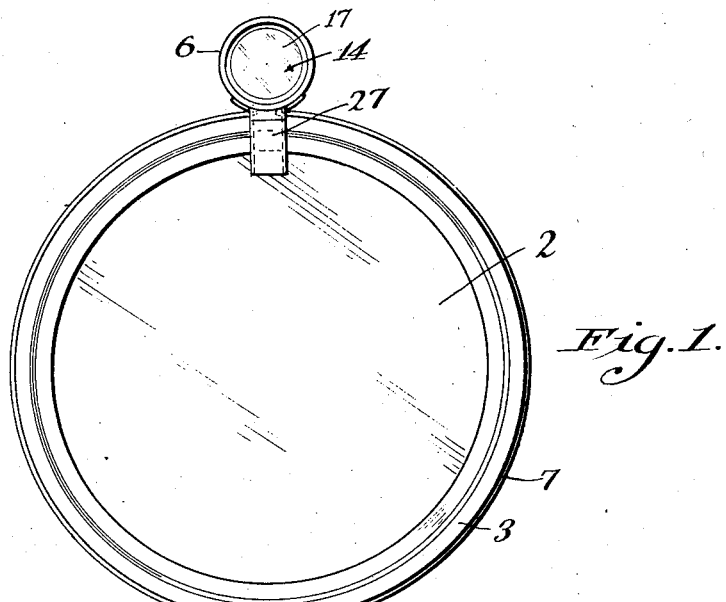
Figure 1 is a front elevation of a conventional headlight having the accessory of my invention secured thereto.
Figure 2:
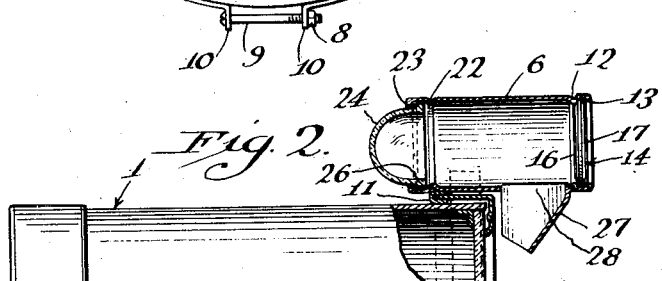
Fig. 2 is a side elevation of a headlight and accessory, the accessory being shown in vertical section and portions of the headlight being broken away to better reveal the manner of attachment of the accessory thereto.
Figure 3:
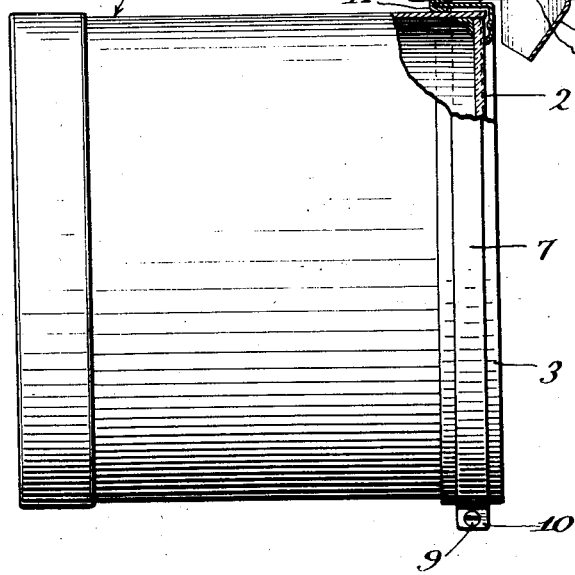
Fig. 3 is a side elevation, partially in section, of the reflecting element of the accessory.

The embodiment of my invention illustrated in the drawings and described herein is shown in operative position upon a conventional headlight consisting of a housing 1 to which a lens 2 is secured by means of a rim 3. The accessory designed to be attached to the headlight and within which resides my invention, comprises a casing 6 preferably tubular in form. A preferably flexible strip 7 is secured to the casing 6 in any convenient manner such as by soldering or riveting and is adapted to encircle the headlight either about the housing 1 or about the rim 3 and adapted to be clamped rigidly in position by means of a nut 8 in threaded engagement upon a bolt 9 which extends through flanges 10 downturned from the ends of the strip 7.

Additional means for securing the housing 6 to the headlight may be provided in the form of a U-shaped clip 11 having one leg secured to the underside of the casing 6 and the other leg adapted to be inserted within the rim 3 and the housing 1 of the headlight. The lower leg of this clip is preferably formed considerably extended so that it may be cut off, when installing the accessory, at the proper point to permit proper engagement with the rim 3.

An annular bead 12 and crimping 13 in the forward end of the casing 6 provide a bezel for the retention of a reflecting element 14 which is composed preferably of a pair of round mirrors 16 and 17, each provided with the customary silvering 18 and 19 respectively and being beveled at their edges as at 21. These mirrors are placed back to back in which position they may be maintained by the use of any suitable cementitious material, or if it be so desired the mirrors may be left not secured together, reliance being placed upon the crimping 13 and bead 12 to retain them in proper relative position.

The annular bead 22 and crimping 23 in the after end of the casing 6 provide a bezel similar to that previously described, for the retention of a jewel 24 which is preferably composed of translucent colored material and hemispherical in shape, with an annular flange 26 at its base adapted to be engaged by the crimping 23 in order to retain the jewel in position.

An apron 27 depending from the lower side of the casing 6 in front of the lens 2 is adapted to deflect part of the rays emanating from the headlight upwards through an aperture 28 in the casing and onto the mirror 16, whence they are reflected backwards to effect the illumination of the jewel 24.

The mirror 17, which is positioned to face forwards, is adapted to catch rays of light emanating from the headlight of an approaching vehicle, the object being to warn the driver of that vehicle in the event that the headlight to which the accessory is attached is not properly illuminated.

When the above described accessory is properly positioned upon a headlight and when that headlight is illuminated, the jewel 24 will also be illuminated, due to that portion of the rays of light from the headlight, which are reflected to the jewel by the apron 27 and mirror 16. It may thus be readily understood that the driver of the vehicle equipped with the headlight attachment has at all times an indication as to whether or not his headlights are properly illuminated, thus obviating liability of driving an automobile or other vehicle without having the headlights turned on. It all too frequently happens, especially when driving at night upon a brightly lighted street, that an automobile driver is not aware of the fact that his headlights are not turned on; and the installation of the above described accessory on one or more of the headlights will fill a long-felt want in overcoming this possibility. The accessory also serves to indicate to a driver that his headlights are turned on during the day, at which time it is not at all infrequent for drivers to operate their vehicles with the headlights burning, due to their ignorance of the fact that they are turned on.

I claim:

1. An attachment for a headlight including a lens retained in position by a rim, comprising a tubular casing, a band secured to the side of said casing and adapted to encircle the headlight to position the casing thereupon with its forward end projecting beyond the front of the headlight, means for clamping said band in place, a clip secured at one end to said casing and having its other end extended to permit its engagement under the lens-retaining rim of said headlight, a mirror secured within the forward end of said casing and facing rearwards, an apron depending from said casing before said headlight and adapted to reflect some of the rays of light emanating from said headlight through an aperture in said casing and onto said mirror, a colored, translucent jewel secured within the after end of said casing and adapted to be illuminated by light reflected from said mirror and a forward facing mirror secured within the front end of said casing.

2. An attachment for a headlight including a lens retained in position by a rim, comprising a tubular casing, a band secured to the side of said casing and adapted to encircle the headlight to position the casing thereupon with its forward end projecting beyond the front of the headlight, means for clamping said band in place, a clip secured at one end to said casing and having its other end extended to permit its engagement under the lens-retaining rim of said headlight, a mirror secured within the forward end of said casing and facing rearwards, an apron depending from said casing before said headlight and adapted to reflect some of the rays of light emanating from said headlight through an aperture in said casing and onto said mirror and a colored, translucent jewel secured within the after end of said casing and adapted to be illuminated by light reflected from said mirror.

3. An attachment for a headlight, comprising a tubular casing, a band secured to the side of said casing and adapted to encircle the headlight to position the casing thereupon with its forward end projecting beyond the front of the headlight, means for clamping said band in place, a mirror secured within the forward end of said casing and facing rearwards, an apron depending from said casing before said headlight and adapted to reflect some of the rays of light emanating from said headlight through an aperture in said casing and onto said mirror, a colored, translucent jewel secured within the after end of said casing and adapted to be illuminated by light reflected from said mirror and a forward facing mirror secured within the front end of said casing.

4. An attachment for a headlight, comprising a tubular casing, a band secured to the side of said casing and adapted to encircle the headlight to position the casing thereupon with its forward end projecting beyond the front of the headlight, means for clamping said band in place, a mirror secured within the forward end of said casing and facing rearwards, an apron depending from said casing before said headlight and adapted to reflect some of the rays of light emanating from said headlight through an aperture in said casing and onto said mirror and a colored, translucent jewel secured within the after end of said casing and adapted to be illuminated by light reflected from said mirror.

5. A headlight attachment comprising a tubular casing, means for securing the casing to said headlight in axial parallelism therewith and with the forward end of the casing projecting beyond the front of the headlight, a mirror secured within the forward end of said casing facing rearwards, an apron depending from said casing before said headlight and adapted to deflect some of the rays of light emanating from said headlight through an aperture in said casing and onto said mirror, a jewel secured within the after end of said casing and adapted to be illuminated by light reflected by said mirror and a forward facing mirror secured within the front end of said casing.

In testimony whereof I have signed my name to this specification.

DIRK RINGERS.